(12) United States Patent
Van Der Merwe

(10) Patent No.: US 7,174,643 B2
(45) Date of Patent: Feb. 13, 2007

(54) HAND TOOL

(76) Inventor: Claude Thomas James Van Der Merwe, 30th Avenue, Villieria, Pretoria (ZA) 0186

( * ) Notice: Subject to any disclaimer, the term of this patent is extended or adjusted under 35 U.S.C. 154(b) by 4 days.

(21) Appl. No.: 10/415,794

(22) PCT Filed: Nov. 2, 2001

(86) PCT No.: PCT/ZA01/00168

§ 371 (c)(1),
(2), (4) Date: Oct. 22, 2003

(87) PCT Pub. No.: WO02/057041

PCT Pub. Date: Jul. 25, 2002

(65) Prior Publication Data

US 2005/0072008 A1 Apr. 7, 2005

(30) Foreign Application Priority Data

Nov. 4, 2000 (ZA) .................... 2000/2175

(51) Int. Cl.
*B27B 21/00* (2006.01)
*B27B 21/02* (2006.01)
(52) U.S. Cl. ............................. 30/507; 30/506; 30/509
(58) Field of Classification Search ............ 30/509, 30/517, 514, 513, 506, 507, 508, 515, 519, 30/504, 166, 295; D8/96, 95, 97
See application file for complete search history.

(56) References Cited

U.S. PATENT DOCUMENTS

| | | | | |
|---|---|---|---|---|
| 20,313 A * | 5/1858 | Smith | ............................ | 7/150 |
| 216,267 A * | 6/1879 | Gifford et al. | ................ | 7/150 |
| 939,051 A * | 11/1909 | Matthews | ....................... | 7/150 |
| 1,338,188 A * | 4/1920 | Mendel | .......................... | 7/150 |
| 1,395,957 A * | 11/1921 | Griffin | ......................... | 24/457 |
| 1,515,071 A * | 11/1924 | Rothbauer | ..................... | 7/150 |
| 1,593,352 A * | 7/1926 | Peck | ............................ | 30/510 |
| 1,792,024 A * | 2/1931 | Maly | ............................ | 30/510 |
| 1,852,616 A * | 4/1932 | Kittle | .......................... | 30/508 |
| 2,755,556 A * | 7/1956 | Lindenbein | .................. | 33/418 |
| 2,853,106 A * | 9/1958 | Kanthack | ..................... | 30/514 |
| 2,974,698 A * | 3/1961 | Drew | ........................... | 30/507 |
| 3,319,337 A * | 5/1967 | Cortez | ......................... | 33/466 |
| 3,727,655 A * | 4/1973 | Garcher | ....................... | 30/514 |
| 4,505,037 A * | 3/1985 | Farkas | ......................... | 30/122 |
| 5,271,158 A * | 12/1993 | Chen | ........................... | 30/508 |
| 5,325,597 A * | 7/1994 | Clifton, Jr. | ................... | 30/514 |
| 5,577,325 A * | 11/1996 | Bentley | ....................... | 30/507 |
| 5,722,173 A * | 3/1998 | Huang | ......................... | 30/510 |
| 6,098,294 A * | 8/2000 | Lemos | ........................ | 30/513 |

\* cited by examiner

*Primary Examiner*—Boyer D. Ashley
*Assistant Examiner*—Ghassem Alie
(74) *Attorney, Agent, or Firm*—Merchant & Gould P.C.

(57) ABSTRACT

The invention provides a frame (12) of a hack-saw (10) and, particularly, the handle formation (14), defines shoulder formations (22) that define a linear edge (24) on opposite sides of the extension formation (16), the operative external edge (26) of the extension formation (16) extending perpendicularly with respect of the shoulder formations (22). As such, the frame (12) of the hack-saw (10) can be used as a conventional L-square.

7 Claims, 1 Drawing Sheet

HAND TOOL

FIELD OF THE INVENTION

This invention relates to a hand tool.

BACKGROUND OF THE INVENTION

The invention relates in particular to a hand tool in the form of a hack-saw, that is rendered multi-purpose. A hack-saw conventionally comprises a frame, formed of steel or another suitable material, which has a narrow hardened steel blade tensioned between spaced anchoring locations provided by the frame. One end of the frame incorporates a handle whereby the hack-saw is displaceable to provide for the blade to perform a sawing action.

Insofar as the general configuration of a hack-saw is well known and as this does not constitute a part of the present invention, this is not described in any further detail herein. Also, any reference herein to a hack-saw must be interpreted as a reference to a hack-saw of a conventional type which has a frame incorporating a handle formation, at one end thereof, and an extension formation that extends from the handle formation to a free end disposed with respect to the handle formation to provide for a steel blade to be tensioned between anchoring locations defined at the said free end of the extension formation and at the handle formation end of the frame, respectively.

SUMMARY OF THE INVENTION

According to the invention there is provided a hack-saw which includes a frame incorporating a handle formation, at one end of the frame, and an extension formation that extends from the handle formation to a remotely located free end, and anchoring formations provided at the said free end of the extension formation and at the handle formation end of the frame respectively, which permit a hack-saw blade to be tensioned across the frame, and in which the handle formation part of the frame defines a shoulder formation with respect to the extension formation and the extension formation defines a longitudinal edge that is disposed perpendicularly to the said shoulder formation, to permit use of the frame as a square.

The longitudinal edge defined by the extension formation that is disposed perpendicularly to the shoulder formation defined by the handle formation particularly is an operative external edge segment of the extension formation, permitting use of the frame of the hack-saw as an L-square.

A preferred embodiment of the invention provides for the handle formation to define a shoulder formation on opposite sides of the extension formation, rendering the frame, when used as a square, invertible. In practice, either shoulder formation can be positioned to bear against the edge of, for example, a planar timber sheet element, or the like, with the extension formation extending across the sheet element at 90° to the said edge, thus permitting use of the frame as a conventional square.

The extension formation of the frame that extends from the handle formation of the frame may have markings applied thereto that permit use of the extension formation as a ruler. Particularly, the markings may comprise millimetre markings, or the like.

Still further according to the invention, the extension formation may define a quadrant segment, near the end thereof disposed remote from the handle formation, and a cross member may extend across the quadrant segment in a configuration in which the quadrant segment in combination with the cross member can be used as a protractor, particularly with the aid of suitable markings applied to the quadrant segment and the cross member.

Still further according to the invention, the extension formation may have a first bubble level located therein at a location between opposite ends thereof, permitting use of the frame of the hack-saw and, particularly, of the extension formation part thereof, as a level. The handle formation may have a second bubble level tube located therein in an orientation with respect to the shoulder formation to permit use of the frame as a level in mutually orthogonal orientations.

The handle formation of the frame may still further define a 30°/60° square, permitting use of the frame of the hack-saw as a 30°/60° square.

The handle formation may include one or more projections which may be used to align the 30°/60° square with an edge of a workbench or workpiece.

The one or more projections may be used to stabilize the hack-saw frame when standing on its end in use as a set square.

It will thus be understood that the hack-saw of the invention can serve as a multi-purpose tool whereby conventional hack-saw applications can be performed, as well as measuring and marking applications commonly performed with the aid of a square, a level, and the like.

The invention accordingly extends also to a multi-purpose tool that comprises a frame for a hack-saw, as herein envisaged, and the invention extends also to such a multi-purpose tool.

DESCRIPTION OF THE DRAWINGS

Further features of the invention are described hereafter, by way of example, with reference to the accompanying diagrammatic drawings. In the drawings.

Figure 1:
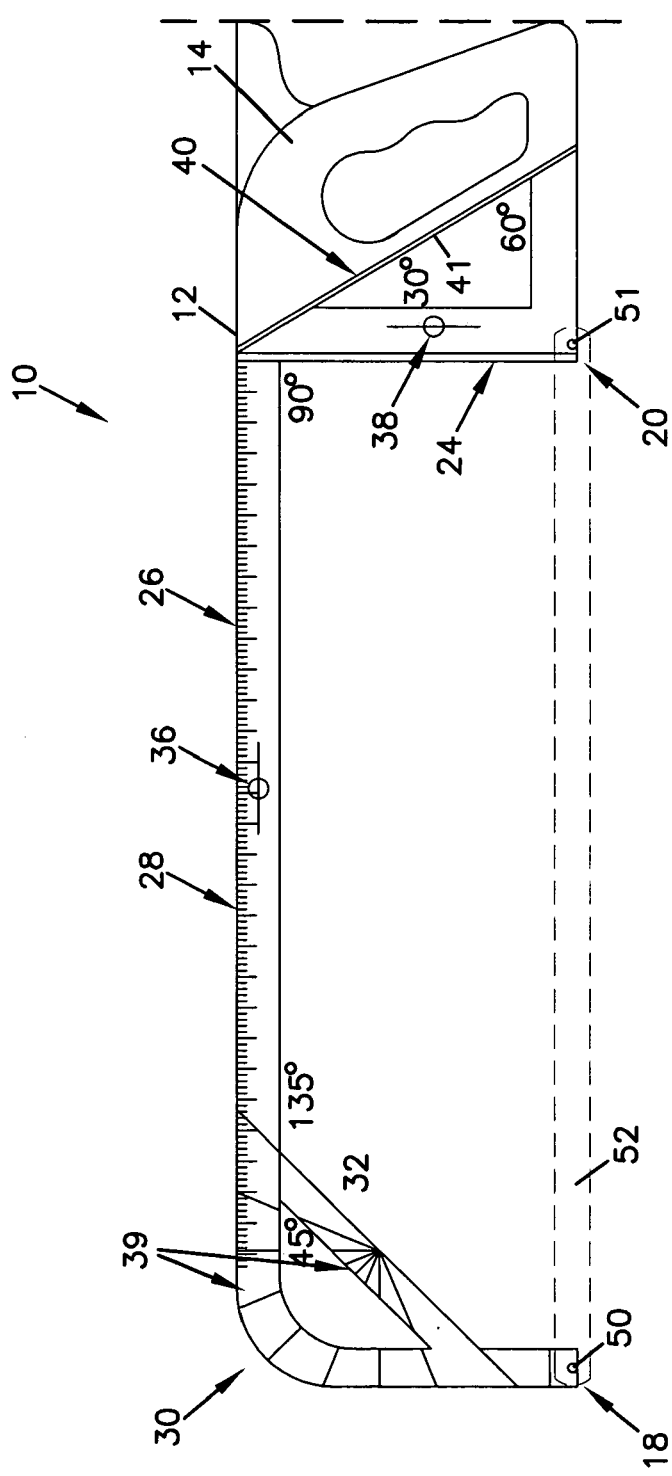
FIG. 1 shows an elevational side view of a hack-saw, in accordance with the invention.
Figure 2:
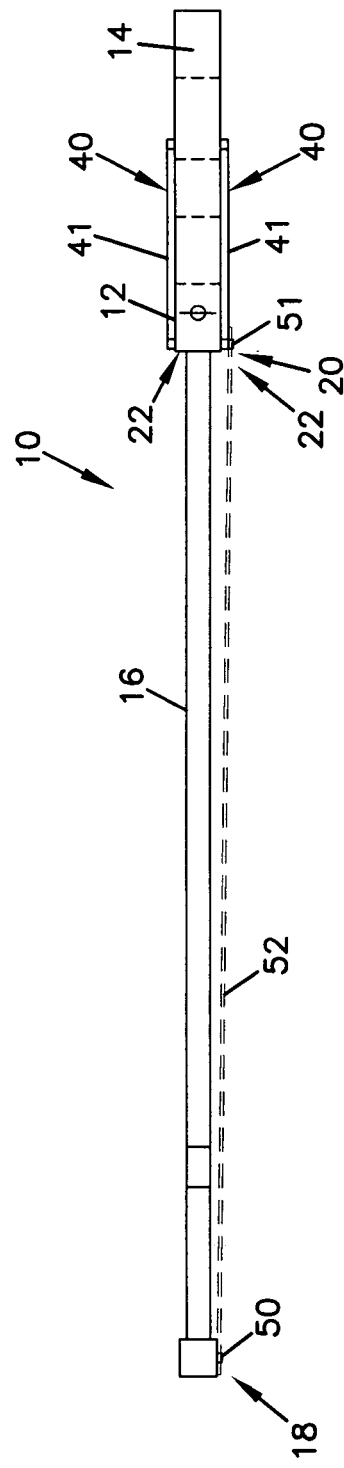
FIG. 2 shows a plan view of the hack-saw of FIG. 1.

Referring to the drawings, a hack-saw, in accordance with the invention, is designated generally by the reference numeral 10. The hack-saw 10 comprises a frame 12, that is formed of steel, or of any suitable material, the frame 12 incorporating a handle formation 14 at one end thereof and an extension formation 16 that extends from the handle formation 12 to a free end 18. The free end 18 is disposed with respect to the handle formation 14 in a configuration in which it permits a hack-saw blade (not shown) to be tensioned between anchoring locations provided respectively at the said free end 18 of the extension formation 16 and at a location 20 at the handle formation end of the frame 12. With a hack-saw blade tensioned across the frame 12 between the anchoring locations indicated, the hack-saw 10 can be used in a conventional manner, which is not described in further detail herein.

In accordance with the invention, the frame 12 of the hack-saw 10 and, particularly, the handle formation 14, defines shoulder formations 22 that define a linear edge 24 on opposite sides of the extension formation 16, the operative external edge 26 of the extension formation 16 extending perpendicularly with respect of the shoulder formations 22. As such, the frame 12 of the hack-saw 10 can be used as a conventional L-square. For example, either shoulder formations 22 can be positioned to bear against the edge of a planar timber sheet, or the like, which will provide for the extension formation to extend across the sheet at 90° to the said edge, permitting marking of a line at this 90° angle to the said edge. This clearly constitutes a conventional application of a L-square and the frame 12 of the hack-saw 10 clearly can be similarly used for any other applications of a L-square.

The segment of the extension formation 16 that defines the longitudinal edge 26 further has millimetre markings 28 applied thereto along the length thereof, thus permitting the extension formation 16 of the frame 12 also to be used as a conventional ruler.

Still further, the corner segment 30 of the extension formation 16 defines a quadrant segment and has a cross member 32 extending across the quadrant segment 30. With markings 34 applied thereto as shown, the quadrant segment 30 in combination with the cross member 32 can be used as a protractor.

Still further, the extension formation 16 has a first bubble level tube 36 located therein in a configuration in which the frame can be used as a conventional level, whereas a second bubble level tube 38 is located in the handle formation 14, permitting the frame 12, with the aid of the edge 24, to serve as a level in mutually orthogonal orientations thereof.

The handle formation 14 of the frame 12 further has a 30°/60° square 40 defined therein that permits use of the frame 12 as a 30°/60° square 40 includes a projection 41. The frame 12 of the hack-saw 10 is thus adapted to perform multiple functions in addition to its basic function of serving a support for a hack-saw blade.

The handle formation 14 is configured such that when the hacksaw frame 12 is placed on a planar surface the L-square is perpendicular with the surface.

It must be understood that a hack-saw frame can be associated with different combinations of the features as described above. Also, the configuration of the hack-saw of the invention is greatly variable and the invention extends also to all such alternative configuration hack-saws which still incorporate the principles of the hack-saw as hereinabove described.

The invention claimed is:

1. A hack-saw frame which incorporates a handle formation, at one end of the frame, and an extension formation that extends from the handle formation to a remotely located free end, the handle formation part of the frame defines a shoulder formation with respect to the extension formation and the extension formation defines a longitudinal edge that is disposed perpendicularly to said shoulder formation to permit use of the frame as a square;

wherein the extension formation defines a quadrant segment, near the end thereof disposed remote from the handle formation, and a cross member extends across the quadrant segment in a configuration in which the quadrant segment in combination with the cross member and suitable markings applied to the quadrant segment and the cross member can be used as a protractor.

2. A hack-saw frame as claimed in claim 1, wherein the longitudinal edge defined by the extension formation that is disposed perpendicularly to the shoulder formation defined by the handle formation particularly is an operative external edge segment of the extension formation, permitting use of the frame of the hack-saw as an L-square.

3. A hack-saw frame as claimed in claim 1, wherein the handle formation defines said shoulder formation on opposite sides of the extension formation, rendering the frame, when used as a square, invertible.

4. A hack-saw frame as claimed in claim 1, wherein the extension formation of the frame that extends from the handle formation of the frame has markings applied thereto that permit use of the extension formation as a ruler.

5. A hack-saw frame as claimed in claim 1, wherein the extension formation has a first bubble level tube located therein at a location between opposite ends thereof, permitting use of the frame as a level.

6. A hack-saw frame as claimed in claim 5, wherein the handle formation has a second bubble level tube located therein in an orientation with respect to the shoulder formation to permit use of the frame as a level in mutually orthogonal orientations.

7. A hack-saw frame as claimed in claim 1, wherein the handle formation of the frame defines a 30°/60° square, permitting use of the frame as a 30°/60° square.

* * * * *